June 18, 1940.  O. W. LOUDENSLAGER ET AL  2,205,102
MODEL TEST PIECE
Filed June 4, 1937    2 Sheets-Sheet 1
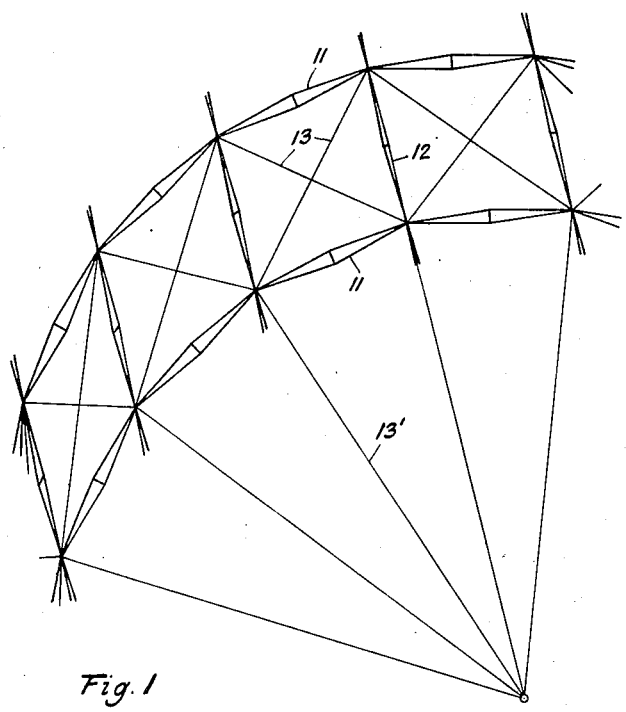
Fig. 1
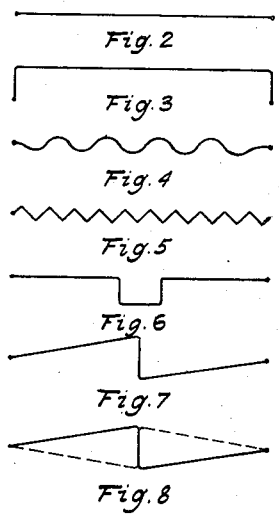
Fig. 2
Fig. 3
Fig. 4
Fig. 5
Fig. 6
Fig. 7
Fig. 8
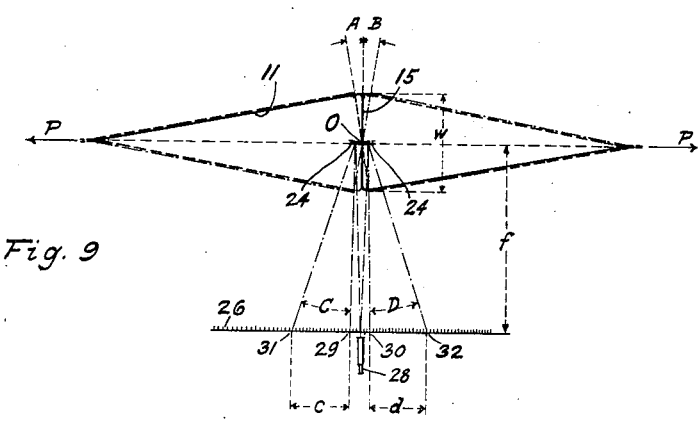
Fig. 9
Inventors
OSCAR W. LOUDENSLAGER
LLOYD H. DONNELL
By
Attorney June 18, 1940. O. W. LOUDENSLAGER ET AL 2,205,102
MODEL TEST PIECE
Filed June 4, 1937 2 Sheets-Sheet 2
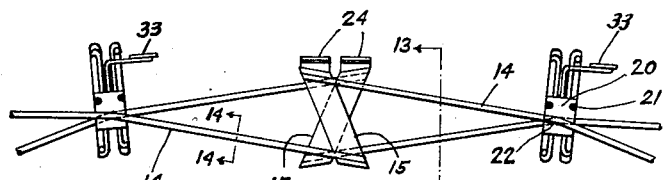
Fig. 10
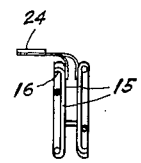
Fig. 13
Fig. 14. Fig. 15. Fig. 16. Fig. 17.
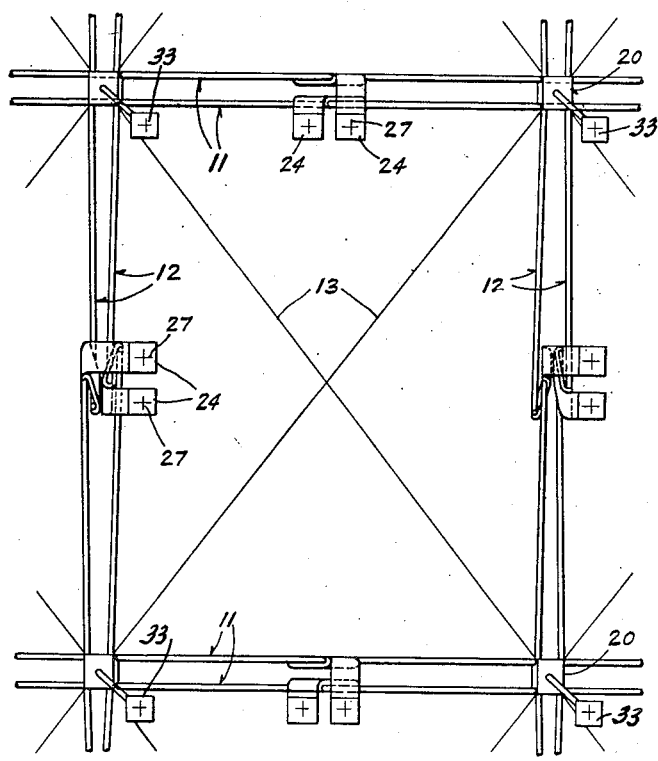
Fig. 11
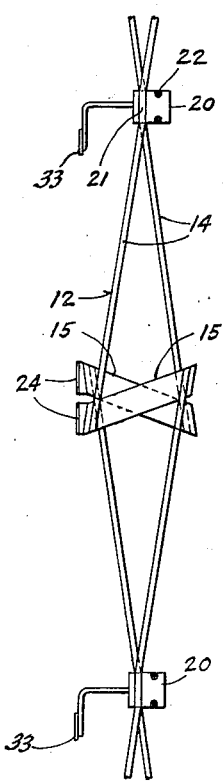
Fig. 12
Inventors
OSCAR W. LOUDENSLAGER
LLOYD H. DONNELL
By
Attorney Patented June 18, 1940

2,205,102

UNITED STATES PATENT OFFICE 2,205,102

MODEL TEST PIECE

Oscar W. Loudenslager, Akron, and Lloyd H. Donnell, Cuyahoga Falls, Ohio, assignors to Goodyear-Zeppelin Corporation, Akron, Ohio, a corporation of Delaware Application June 4, 1937, Serial No. 146,444

12 Claims. (Cl. 265—1)

This invention relates to a novel construction of members of models representing frame structures and to the determination of the stresses in such structures, in particular of statically indetermined systems, as, for instance, a rigid airship hull structure.

Previous to this invention, it has been the practice to build the members of a model for such purpose of plain wire or rod. Such a construction if designed, for instance, to have the proper bending stiffness, would in most cases be enormously too stiff under axial load, and several times too stiff under torsion. Correct values for these three elastic properties, which are necessary in the case of an airship hull and in many other applications if the model is to correctly represent the prototype, can be obtained by making the model member in all its details exactly like the prototype, or in some cases, by making the model members of a straight rod of complex cross section. However, these methods are usually entirely impractical or much more expensive than the method given by this invention. Moreover, while small mirrors attached to such members could easily be used to measure the angular bending and twisting strains with ample sensitivity and accuracy, the measurements of the very small unit axial strain (which must be the same as in the prototype if "second order" elastic effects, such as those relating to stability etc., are to be to scale) is much more difficult.

According to this invention, the disadvantages of previous methods are obviated by employing, instead of a straight rod for each structural member, an offset Z-shaped rod or preferably two Z-shaped rods united at their ends, as illustrated in the accompanying drawings. In practice the central vertical leg of the Z's can be made much stiffer than the remainder, so that the complete unit will respond to a variable bending moment in substantially the same way as a single beam of uniform moment of inertia. The proper axial stiffness is obtained by using the right length of this central vertical leg, and this length is found to be about four times the radius of gyration of the beam scaled down. The size of the rod forming the remainder of the Z is a function of the moment of inertia of the actual girder, and is found in the same way as if the model member consisted of two simple straight rods. The proper stiffness in torsion can be obtained by giving the rod a certain simple cross section. Thus, for model members representing airship girders, split tubes or rods of +, I, L or of other open cross-section can be used, while for many applications plain round or flattened wire would be sufficient.

To obtain sensitive and accurate measurements of axial girder deformations, mirrors are attached to the central legs of the two Z's. As soon as the member is subjected to axial forces there is a relative movement of these two mirrors and by means of a sighting device placed at a suitable distance from the model this relative rotation can be measured and from it the magnitude of the compression or tension force can be computed.

Mirrors, located at the ends or joints of the members, serve to measure bending and torsional strains of the members and can be used for all members connected to these joints. From these mirror readings the corresponding bending and torsion moments can be computed.

For a better understanding of this invention, reference may now be had to the attached drawings, in which Fig. 1 is a perspective fragmentary view of a cylindrical structure composed of structural members made according to the invention;

Fig. 2 illustrates diagrammatically an axially flexible member extending in a straight line;

Figs. 3 to 8 are modifications which can be made to have the same axial stiffness as Fig. 2;

Fig. 9 is a diagrammatic view of an axially flexible member of the preferred type (see Figs. 7 and 8) indicating the method of measuring the axial deflection;

Fig. 10 is a fragmentary side view of a ring of actual model structure;

Fig. 11 is a plan view of the structure shown in Fig. 10;

Fig. 12 is a side view of a longitudinal member of this structure;

Fig. 13 is a cross-sectional view of a ring member along the lines 13—13 in Fig. 10; and Figs. 14, 15, 16 and 17 each illustrate different cross-sections to be used for the structural member shown in Fig. 10.

Referring now to Fig. 1, the cylindrical structure which we have taken as an illustration of the use of this invention is composed of ring members 11 and longitudinals 12, which are braced by wires 13. Radial bracing wires 13' are provided to preserve the circular shape of the structure. Because of the difficulty of measuring accurately the axial strains of a straight member as shown in Fig. 2, model structures according to the invention may be composed of flexible members as illustrated by the Figures 3 to 8 or of similar construction in which the shape of the member may deviate laterally from the straight line connecting the ends of the member. A Z-shaped beam, according to Fig. 7, has been found to be the most practical for the purpose. Two of such beams are combined to form a symmetrical member as shown in Fig. 8, and which is the preferred type to be used in the construction of structural models.

Members comprising two symmetrically arranged beams have the advantage that angular changes of the offsets can be measured accurately, even if the model should accidentally change its position relative to the sighting device while measurements are being taken, because with double mirrors the difference between the zero readings and the load readings does not change under such conditions. Another advantage of the double beam member is that secondary moments which may occur in one beam are balanced within the member by opposing moments acting on the other beam and, therefore, do not distort the structure as a whole.

A practical application of these members is illustrated by the Figures 10 to 14, which represent a panel composed of ring members 11, longitudinals 12 and wire bracing 13. Each structural member is made up of two closely spaced and substantially parallel Z-shaped beams, each of which is composed of two pieces of slit tubing 14, or of bars having a +, I, L or some other open cross section, and of a relatively stiff connecting piece 15, representing the center portion of the Z, to which the tubings are fastened at 16. Blocks 20 join the ring members 11 and the longitudinals 12 together. For easy assembling, the blocks are provided with grooves 21 and 22 in which the tubings 14 are embedded and fastened. The joints thus made are very stiff and represent about the conditions of the prototype.

The bracing wires 13 also are fastened to the joints 20 under proper scale tension. Mirrors 24, provided with cross marks 27, located preferably in the same plane and at the same level, are attached to the center pieces 15 of the Z-beams of each structural member and other sets of mirrors may be similarly applied to the joints 20.

Although it is preferable to mark the mirrors, it is possible to use a mark at some convenient point which is reflected by the mirror and the angular displacement thereof measured as is well understood in the art. Also if all of the mirrors shown in Fig. 11 are to be simultaneously observed, an eye-piece can be set up with its axis passing through the intersection of wire 13 and in that case the mirrors would be arranged so that they are on a surface of an imaginary sphere, the center of which is at the focal point of the eye-piece.

The center mirrors 24 are mainly intended for measuring axial deflections of the girders due to compression and tension forces, and the mirrors 33 located at the joints 20 are used for determining the deflection due to bending and torsional forces. The mirrors located at the joints can be used for all girders meeting at one joint. All mirrors are advantageously attached to the outside of the model to avoid obstructions in taking readings.

Fig. 9 illustrates the method of measuring the axial deflections of a girder 11 or 12, in which the center bars 15 of the double Z are shown in vertical position. A mirror 24 is rigidly attached to each of the bars 15.

At some distance $f$ from the girders is placed a scale 26 or a piece of coordinate paper and a sighting device, which may be a telescope 28 or just a pin hole in the coordinate paper. First, a zero-reading is made. Looking through the sighting device 28 against the mirrors 24, the scale can be observed in the mirrors with the line 29 coinciding with the vertical cross line of the left mirror and the line 30 with that of the right mirror. These two points indicating zero-load are recorded. If now an axial force P is applied to the member 11, the Z-shaped beams tend to deform as shown by the dotted lines whereby the transverse portions, and accordingly the mirrors 24, rotate about the center O and describe angles A and B, respectively. New readings are now taken, and the points observed on the scale coinciding with the lines on the mirrors are 31 and 32, respectively. The angles A and B are equal to each other and so are the angles C and D, but these are twice as large as the former, respectively. Fig. 9 shows the deflection angles rather exaggerated for the sake of clearness. However, owing to the fact that the actual angular deflection of the offset is relatively small, the readings on a straight scale are sufficiently exact for practical purposes and, therefore, can be taken as direct proportional to the actual longitudinal deflection of the beam. Of course, instead of a straight scale, a circular scale with its centers located in the centers of the mirrors could be employed. The actual longitudinal deflection of the member is obtained by adding the changes $c$ and $d$ of the scale readings, which are then to be multiplied by half the width W of the offset of the member and divided by the distance $f$ of the center line of the member from the scale. The mirrors may be attached to any point of the offset portion of the Z-bars and these offset portions are made relatively rigid. In case compression forces act on the member, the transverse bars will rotate in opposite direction and the deflection will be obtained in a similar way.

In order to measure deformation due to torsional strains, the relative angular movement of the mirrors 33 is measured in a manner similar to that described in connection with the central mirrors 24 and after this relative angular movement has been determined the torsional forces can be readily ascertained, since the characteristics of the beam are known. In a similar manner when a bending force is applied to a beam, the angular movement of the mirrors 33 toward and from each other can be measured and the bending force computed.

The model may be built of any material which has a uniform and permanent modulus of elasticity. Epecially suitable materials are steel or brass. The members of the model should be so constructed that under any system of forces or moments having a simple relationship to the forces or the prototype, the unit linear deformations (and relative angular deformations) will be the same as the corresponding unit linear deformations and relative angular deformations of the corresponding prototype members under the prototype forces. The force scale does not need to be the same as the length scale of the model.

In Figs. 14, 15, 16 and 17 are shown various cross-sections which may be used for the members 14, that at the left being the one illustrated in the drawings.

It is to be understood that the embodiment shown in the drawings is but one of many modifications which may be made without departing from the spirit and scope of this invention and therefore we do not wish to be limited in our invention except as set forth in the claims hereunto appended.

We claim:

1. An elastic member in a structural model adapted to extend between two points of said model for determining axial stresses in a corresponding member of a prototype under load, consisting of two Z-shaped beams of identical construction and facing each other in reversed position in two closely spaced planes substantially parallel, the offset portions of said beams being constructed stiff to resist bending and moving angularly under axial forces imparted thereto.

2. An elastic member in a structural model, consisting of at least one beam, adapted to extend between two points of said model for determining the axial or torsional stresses in a corresponding member of a prototype under load and having at least one offset portion, substantially rigid against bending which moves angularly under axial forces imparted thereto, and the longitudinal portions of said member having a cross-section especially flexible against torsion.

3. An elastic member in a structural model consisting at least of one beam, adapted to extend between two points of said model for determining the axial or torsional stresses in a corresponding member of a prototype under load and having at least one offset portion, substantially rigid against bending, which moves angularly under axial forces imparted thereto, and the longitudinal portions of said member having an open tubular cross-section especially flexible against torsion.

4. An elastic member in a structural model, consisting at least of one beam, adapted to extend between two points of said model for determining the axial or torsional stresses in a corresponding member of a prototype under load and having at least one offset portion, substantially rigid against bending, which moves angularly under axial forces imparted thereto, and the longitudinal portions of said member having a cruciform cross section especially flexible against torsion.

5. An elastic member in a structural model, consisting at least of one beam, adapted to extend between two points of said model for determining the axial or torsional stresses in a corresponding member of a prototype under load, and having at least one offset portion, substantially rigid against bending, which moves angularly under axial forces imparted thereto, and the longitudinal portions of said member having an I cross-section especially flexible against torsion.

6. An elastic member in a structural model, consisting of at least one beam, adapted to extend between two points of said model for determining stresses in a corresponding member of a prototype under load, each beam comprising at least one offset portion which moves angularly under axial forces, imparted thereto, and reflecting means fixed to said offset portion in combination with a scale and sighting device to determine the axial deformation of said member by measuring the angular movement of said offset portion, in magnification at a place remote from said offset-portion.

7. An elastic member in a structural model adapted to extend between two points of said model for determining axial, or torsional stresses in a corresponding member of a prototype under load, consisting of two Z-shaped beams identical in construction and facing each other in reversed position in two closely spaced planes substantially parallel, the offset portions of said beams, rigid against bending, moving angularly under axial forces imparted thereto; and the longitudinal portions of said member having a cross section especially flexible against torsion.

8. An elastic member for a structural model consisting of at least one beam adapted to correspond to a prototype, said beam having at least one laterally offset portion to reduce the longitudinal stiffness to an extent to give the said beam the same ratio of longitudinal stiffness to the torsional resistance as in the prototype.

9. An elastic member for a structural model consisting of at least one beam adapted to correspond to a prototype, said beam having at least one laterally offset portion to reduce the longitudinal stiffness to an extent to give the said beam the same ratio of longitudinal stiffness to the bending and torsional resistance as in the prototype.

10. An elastic member for a structural model consisting of at least two similarly shaped beams adapted to correspond to a prototype, each of said beams having at least one laterally offset portion to reduce the longitudinal stiffness to an extent to give to said member the same ratio of longitudinal stiffness to bending resistance as in the prototype, the offset portions of said beams being oppositely arranged and the beams being integrally united at their ends.

11. An elastic member for a structural model adapted to extend between two points of said model for determining axial stresses of a prototype under load, said elastic member being Z-shaped longitudinally with the intermediate portion thereof extending at a substantial angle to the line between the ends of said member.

12. An elastic member for a structural model adapted to extend between two points of said model for determining axial stresses of a prototype under load, said elastic member being Z-shaped longitudinally with the intermediate portion thereof extending at a substantial angle to the line between the ends of said member, the end portions of said elastic member being substantially uniform in cross-section and said intermediate portion being substantially rigid and adapted to move angularly upon the application of longitudinal stresses on said elastic member.

OSCAR W. LOUDENSLAGER.
LLOYD H. DONNELL.